United States Patent
Walker, Jr. et al.

(10) Patent No.: US 7,961,200 B2
(45) Date of Patent: Jun. 14, 2011

(54) IMAGE CROPPING SYSTEM AND METHOD

(75) Inventors: Kenneth A. Walker, Jr., Somerville, MA (US); Alexander K. Schowtka, Weston, MA (US)

(73) Assignee: Vistaprint Technologies Limited, Hamilton (BM)

( * ) Notice: Subject to any disclaimer, the term of this patent is extended or adjusted under 35 U.S.C. 154(b) by 0 days.

(21) Appl. No.: 12/719,576

(22) Filed: Mar. 8, 2010

(65) Prior Publication Data

US 2010/0165369 A1  Jul. 1, 2010

Related U.S. Application Data

(63) Continuation of application No. 10/713,446, filed on Nov. 14, 2003, now Pat. No. 7,675,528.

(51) Int. Cl.
*G09G 5/00* (2006.01)

(52) U.S. Cl. ...................................................... 345/620

(58) Field of Classification Search .................. 345/620, 345/628
See application file for complete search history.

(56) References Cited

U.S. PATENT DOCUMENTS 7,209,149 B2 *  4/2007  Jogo ............................. 345/622

* cited by examiner

*Primary Examiner* — Ryan R Yang
(74) *Attorney, Agent, or Firm* — Jessica J. Costa

(57) ABSTRACT

Electronic document design systems and methods allowing a user engaged in customizing an electronic product to re-crop product images in a manner that is compatible with the product layout. Upon selection of an image area in the product design, the user can choose to re-crop the image currently displayed in the image area or to select and crop a different image to be used in the selected image area. A cropping indicator that can be resized and repositioned is provided to the user. The cropping indicator is automatically sized to have and retain the same height to width ratio as the selected image area. Upon completion of any resizing or repositioning operation, the selected image area of the electronic product is updated to reflect the cropping changes made by the user.

35 Claims, 9 Drawing Sheets

IMAGE CROPPING SYSTEM AND METHOD

This application is a continuation of prior application Ser. No. 10/713,446, filed Nov. 14, 2003, which is hereby incorporated by reference in its entirety.

FIELD OF THE INVENTION

The present invention relates to computer-implemented automated electronic product design.

BACKGROUND OF THE INVENTION

Many individuals, businesses, and organizations occasionally have a need for custom materials, such as birth announcements, party invitations, product or service brochures, promotional postcards, personalized holiday cards, or any number of other items. Some of these individuals and businesses turn to sources such as a local print shop for assistance in preparing the materials. Those having access to a suitable computer may perform the product design process themselves using any of the various specialized software products available for purchase and installation on an appropriate computer system or by using a Web-based printing service provider that takes advantage of the capabilities of the Web and modern Web browsers to provide document design services from any computer with Web access at whatever time and place is convenient to the user. Computerized systems typically provide their customers with the ability to access and view pre-designed product templates and enter information to create a customized product design.

The use of pre-designed electronic product templates imposes limitations and constraints on the flexibility of the product design system and its usefulness to many customers. Traditionally, the template provider has individually designed each template by defining various details of the template, such as the size and position of all image and text areas in the template; selecting, cropping and positioning images; defining colors to be used for template elements having a color attribute, and so forth. The template designer adjusts the various elements until the designer is satisfied with the overall appearance of the template. User editing is usually limited to allowing the user to add, modify and position text and perhaps upload images to be added to the product design.

Not only is this prior art individual template design method time consuming and a significant expense for the template provider, in several ways it limits the service providers ability to fully satisfy the desires and requirements of its customers. For example, a template provider may have many electronic images that it would like to make available for use by its customers, but the template provider may only have the resources to produce a limited number of template variations, leaving many images unused and unavailable to customers. In addition, the size and shape of various products offered by the template provider requires that the template provider make image cropping decisions regarding the portion of an image that will be incorporated into a particular product design. The image cropping decision made by the template provider may not be pleasing to all users and some potential customers may be dissatisfied and choose not to complete a product design. As yet another drawback, many potential customers have their own images that they would like to use in a product design in the place of the image provided by the template provider, but they have traditionally had no way of making the substitution in a properly cropped fashion.

Prior art desktop publishing applications having image cropping tools that allow a user to modify images in a document being designed are known in the art, but these prior art cropping operations are typically processed as completely independent operations that are unrelated to and unconstrained by any specific layout or design requirements of the related document. The user is allowed to crop the image in any manner or height to width ratio that the user chooses.

Cropping tools that maintain a fixed ratio between the height and width of the cropped image are known in connection with some photograph printing Web sites that allow a user to upload the user's digital photographs and order printed copies. For example, a user may upload the user's digital picture and specify one of a limited number of standard photograph print sizes, such as 5×7 or 6×8. The Web site will display a cropping indicator having the appropriate ratio of height to width corresponding to the selected print size. The cropping indicator can be positioned and resized by the user while the ratio of the height to width will remain fixed. This is a completely independent cropping operation that is focused solely and narrowly on photographic prints without a notion of layout or design requirements of an associated document or electronic product.

There is a need for a flexible electronic product editing and customization system that allows a product template designer to offer a wide variety of electronic product designs incorporating a substantially unlimited variety of images of various height to width ratios while simultaneously allowing the user to readily and easily re-crop the images in the product design, or select, substitute and properly crop alternate images, in a manner that maintains compatibility with the product design layout.

SUMMARY

The present invention is directed to satisfying the need for computer implemented systems and methods that provide flexible electronic product design image cropping tools.

In accordance with the invention, images in an electronic product design template can be selected and re-cropped by the user. Upon user selection of an image area in the product design, the user can use a cropping indicator to select the portion of a base image to be used in the selected image area. The ratio of the height and width of the cropping indicator will be generated to correspond to the height to width ratio of the associated selected image area. The user can vary the position and size of the crop box relative to the base image, but cannot vary the crop box's height to width ratio. Each time the cropping indicator is repositioned or resized by the user, the corresponding image area in the product design is updated to display the portion of the base image indicated by the new size and position of the cropping indicator.

It is an advantage of the invention that the height to width ratio of the cropping indicator presented to the user automatically corresponds to the height to width ratio of the corresponding image area in the product design.

It is another advantage of the invention that the height to width ratio of the cropping indicator is maintained constant so that the re-cropped portion of the base image will fit properly into the associated image area of the product design.

It is yet another advantage of the invention that the cropping operation can be performed on images supplied by the service provider or on images supplied by the user.

These and other objects, features and advantages of the invention will be better understood with reference to the accompanying drawings, description and claims.

DETAILED DESCRIPTION

Figure 1:
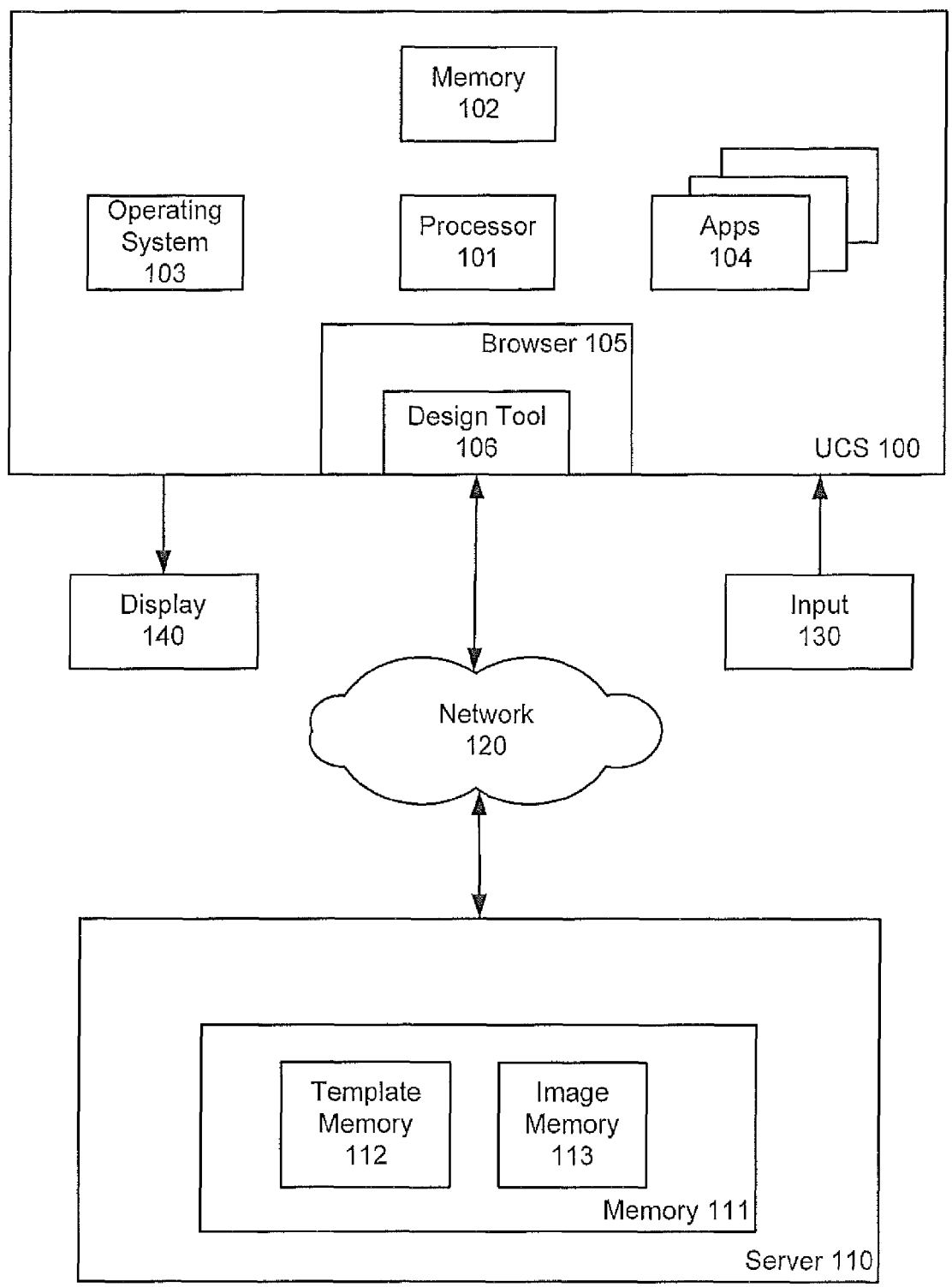
FIG. 1 is a block diagram of a computer system with which the invention may be employed.

Referring to FIG. 1, an exemplary user computer system UCS 100 includes processor 101 and memory 102. Memory 102 represents all UCS 100 components and subsystems that provide data storage, such as RAM, ROM, and hard drives. In addition to providing permanent storage for all programs installed on UCS 100, memory 102 also provides temporary storage required by the operating system and the applications while they are executing. In a preferred embodiment, UCS 100 is a typically equipped personal computer, but UCS 100 could also be a portable computer, a tablet computer or other device. The user views images from UCS 100 on display 140, such as a CRT or LCD screen, and provides inputs to UCS 100 via input devices 150, such as a keyboard and a mouse.

When UCS 100 is operating, an instance of the USC 100 operating system will be running, represented in FIG. 1 by operating system 103. In addition, the user may be running one or more application programs. In FIG. 1, UCS 100 is running Web browser 105, such as Internet Explorer from Microsoft Corporation. Other applications that may be running in USC 100, such as spreadsheet, e-mail, and presentation programs, are represented as applications 104. In the depicted embodiment, design tool 106 is a product design program downloaded to UCS 100 via network 120 from remote server 110, such as downloadable design tools provided by VistaPrint Limited and publicly available at vistaprint.com. Design tool 106 runs in browser 105 and allows the user to prepare a customized product design in electronic form. Alternatively, design tool 106 could have been obtained by the user from memory 102 or from another local source. When the customer is satisfied with the design of the product, the design can be uploaded to server 110 for storage and, if desired by the user, subsequent production of the desired quantity of the physical product on appropriate printing and post-print processing systems. While server 110 is shown in FIG. 1 as a single block, it will be understood that server 110 could be multiple servers configured to communicate and operate cooperatively.

Memory 111 represents all components and subsystems that provide server data storage, such as RAM, ROM, and disk drives or arrays. Template memory 112 contains the various layout, design, color, font, and other information provided by the service provider to enable the creation and rendering of templates. As used in this embodiment, a layout is an XML description that specifies the size, position and other attributes of all product elements such as text containers, image containers, graphics, z-index values and so forth.

Image memory 113 represents the portion of memory 111 that contains the images and any related image attributes used by the service provider to generate the product design, such as the image size, default colors associated with the image, and one or more keywords that have been associated with that image by the printing service provider. Image memory 113 includes a base image and may, but need not, include one or more cropped versions of the base image prepared by the service provider to fit various image container shapes. A wide variety of different templates can be created by combinations of layouts and images. Co-pending and co-owned U.S. application Ser. No. 10/646,554 entitled "Automated Image Resizing and Cropping", filed Aug. 22, 2003, the complete contents of which are hereby incorporated by reference into this application, discloses document editing systems for combining separately stored images and layouts to create document designs.

Figure 2:
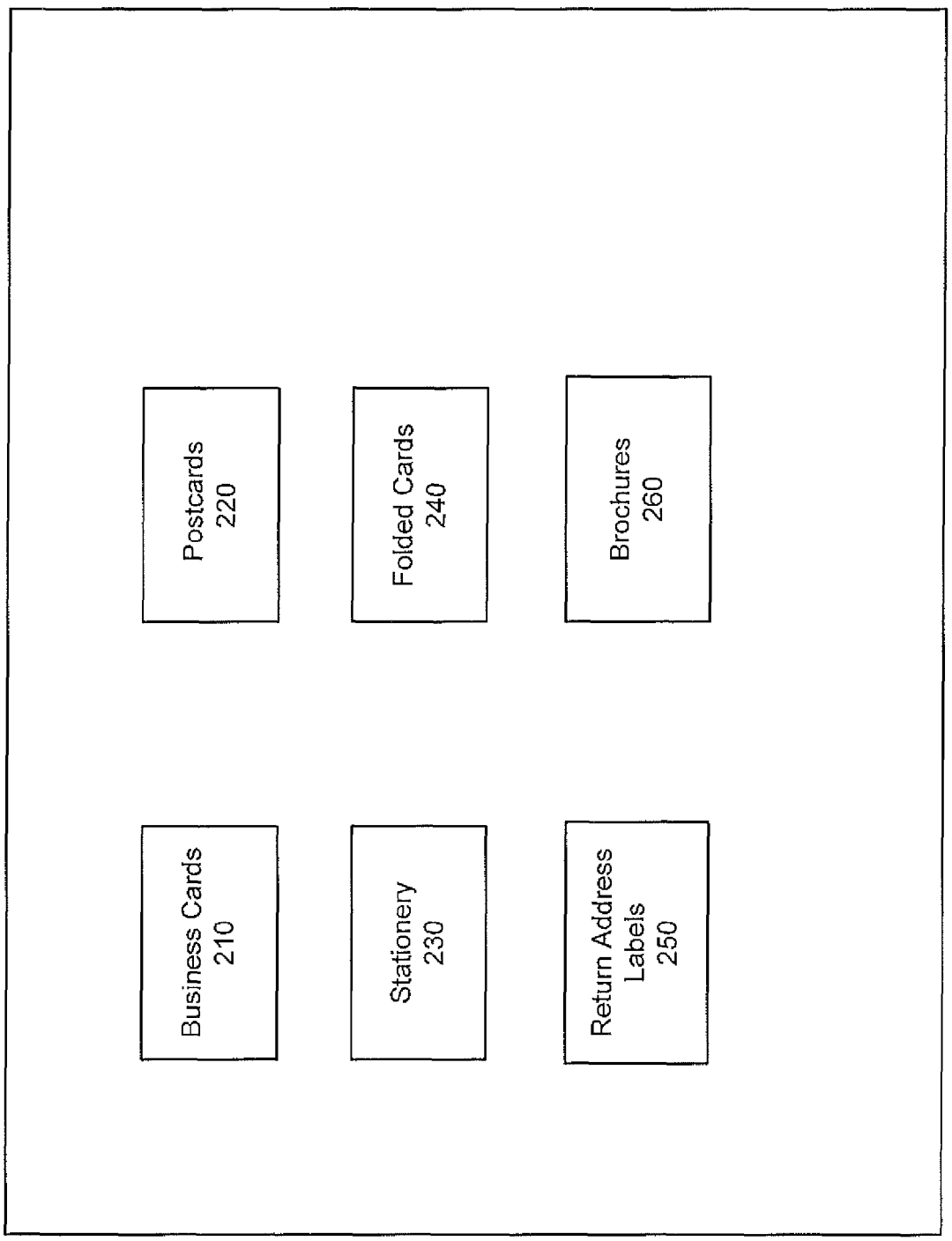
FIGS. 2-8 are schematic representations of displays presented to a user engaged in designing an electronic document.

FIG. 2 is a simplified representation of an introductory product selection page being viewed by the user of UCS 100 on user display 140. In this example, the page displays and promotes various products available from the service provider and offers active controls that allow the user of UCS 100 to select a desired type of product for a more detailed presentation of design options. By way of example, FIG. 2 shows promotional images for business cards 210, postcards 220, stationery 230, folded cards 240, return address labels 250, and brochures 260. Images or promotions for fewer, different or additional products, such as presentation folders, invitations, announcements, thank you cards, gift tags, and so forth could also be presented along with other information and links. It will be understood that the invention is not limited to documents that are intended for eventual printing. The invention is also applicable to the design of documents intended for use in electronic form, such as electronic business cards, online brochures, and templates for presentation graphics software programs. The invention could as well be readily adapted to a wide range of products that a user may wish to customize, such as items of clothing, product containers, promotional goods, and so forth.

As an illustrative example, it will be assumed that the user of UCS 100 desires to create a personalized postcard and, therefore, selects the postcard option, for example by clicking with the user's mouse cursor on the postcard 220 image. The user will then be presented with one or more additional selection screens, not shown, from which the user can review the various postcard categories by general theme or subject matter and then, when the desired category is selected, review one or more pages of thumbnail images of postcard templates prepared by the service provider. When a desired template thumbnail is located, the user can click on the image to cause server 110 to download the selected template information and initiate a custom product design session. As an alternative to providing a large gallery of thumbnail template images for the user to scan, the service provider could provide a keyword searching tool to allow the service provider to display only thumbnails of templates with images or other content corresponding to the user's search terms.

Figure 3:
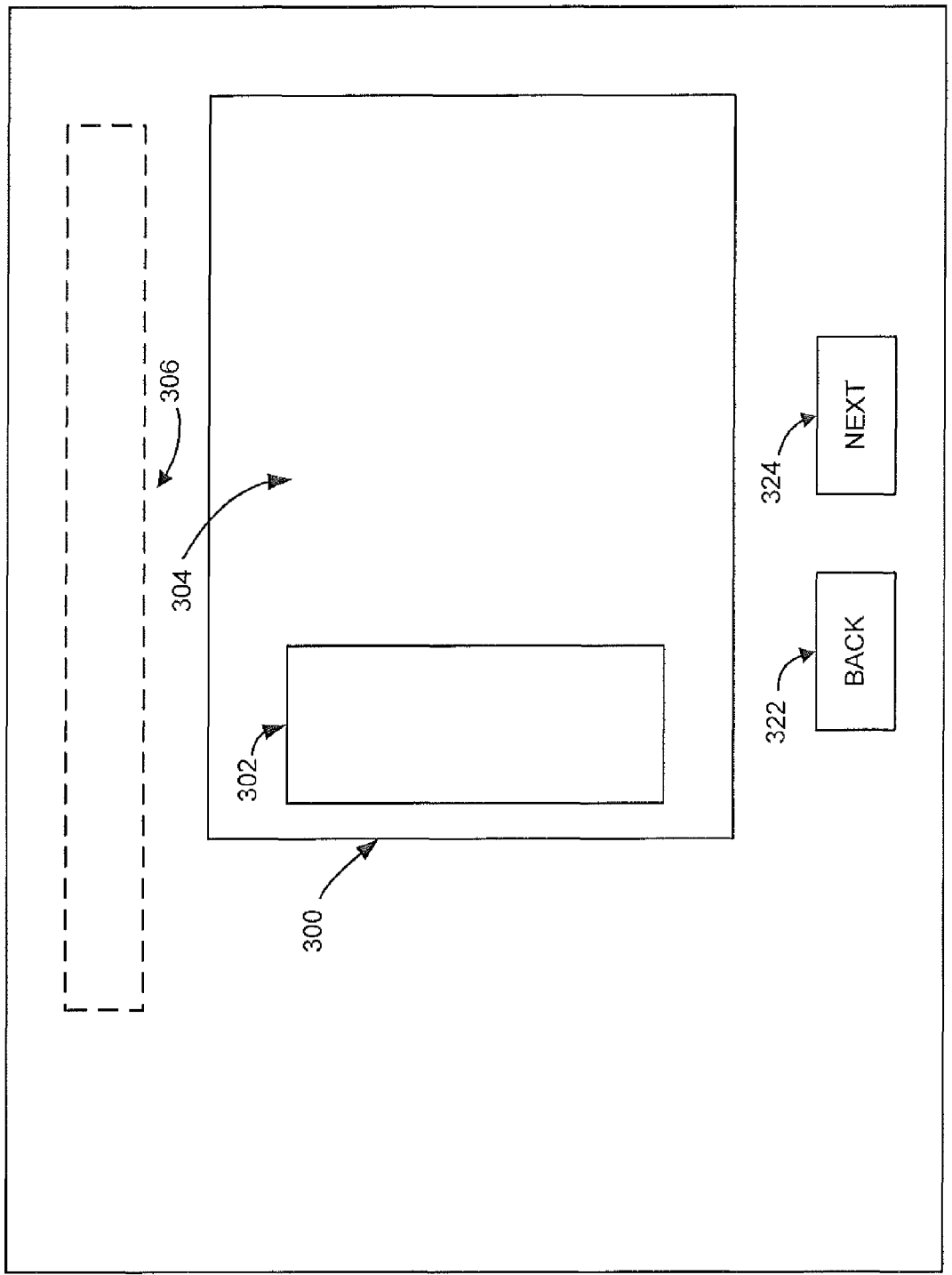

Referring to FIG. 3, when the user selects a specific template thumbnail that the user desires to customize, the user is presented with a larger customizable template image 300 of the selected product design which may contain a wide variety and number of images, colors, graphics and other design elements. For simplicity of discussion, in the example shown in FIG. 3, template 300 represents one side of a postcard being designed by a user. The design contains two image containers, also referred to herein as image areas: a background image area 304 covering the entire side of the postcard template and smaller image area 302 that appears over image 304. As mentioned above, the template 300 displayed to the user is the result of the combination of various separately stored template component elements including the two images and the layout describing the size and position of the containers for the two images. The initial template 300 is the starting point for the user's customized product design. The user can not only add the user's personalized text and additional images, but can also, as discussed below, modify the original cropping of the images in image area 302 and/or 304 or select and crop new images to replace the images in image areas 302 and/or 304.

To allow the user to customize the product design, the user is provided with template editing tools. Edit Tool Bar 306, depicted as a dashed box in FIGS. 4-8, contains various buttons, controls and menus allowing the user to add additional text boxes, insert text, change the font, change font attributes, and perform other typical editing actions. The techniques for designing and using edit tool bars are well known in the art. Navigation buttons Back 322 and Next 324 allow the user to move back to the previous display screen or ahead to the next. Different or additional navigation means could also be employed.

Depending on the level of customizing capabilities the service provider desires to give to the user, the service provider may also choose to provide the user with one or more additional instructions, tools, or controls (not shown) to facilitate user editing of template 300, such as tools for changing the template layout, the color scheme, the design effects, or the font scheme. Co-pending and co-owned U.S. application Ser. No. 10/449,836 entitled "Electronic Document Modification", filed May 20, 2003, the complete contents of which are hereby incorporated by reference into this application, describes a document editing system and method using separately selectable layouts, designs, color schemes and font schemes.

Figure 4:
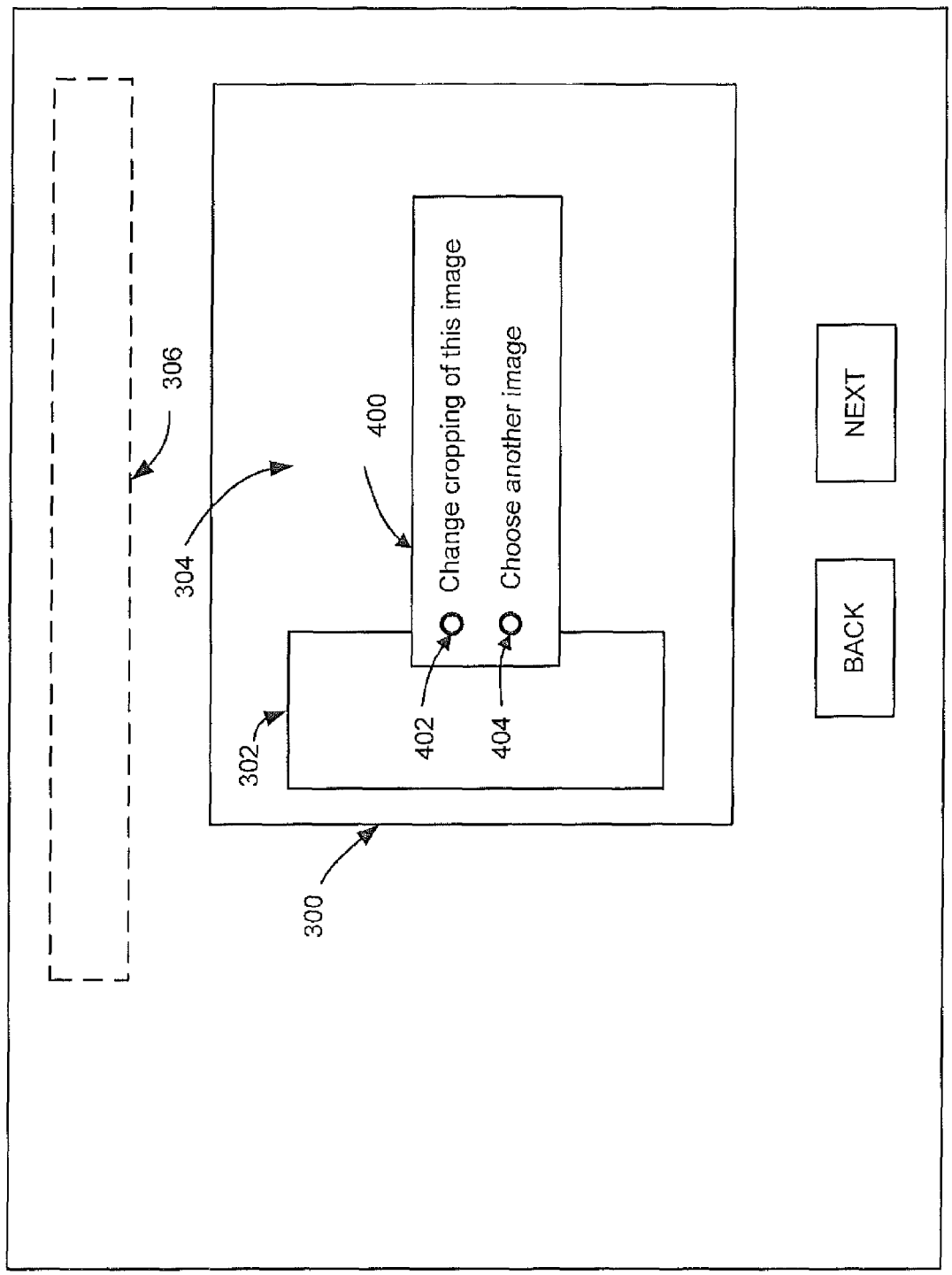

Design tool 106 provides one or more methods to allow the user to indicate a desire to modify an image area, for example by positioning the user's mouse cursor over the desired image area and double clicking. Referring to FIG. 4, in response to the user's action of double clicking while the cursor is positioned over one of the image areas, window 400 is presented to the user. Window 400 offers the user the choice of changing the cropping of the current image in the image area selected by the user or selecting a different image to replace the current image in the selected image area. Each of these operations will be discussed in more detail below. The user could also, if desired, choose to cancel the operation by closing window 400.

Figure 5:
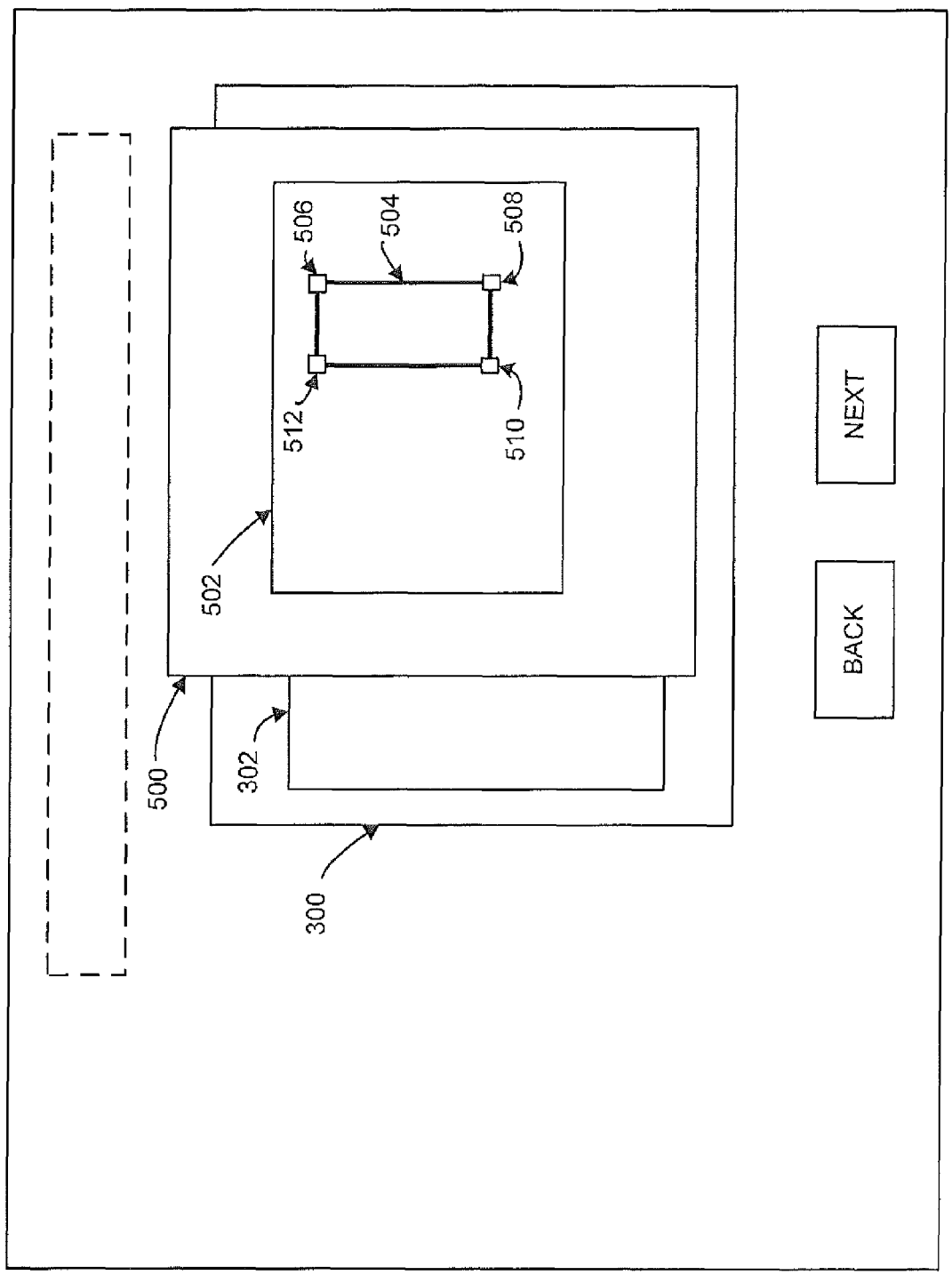

In the example shown in FIG. 5, the user has double clicked on image area 302 and then selected radio button 402, indicating a desire to re-crop the current image in area 302. In response to the user's selection, cropping window 500 has been opened. Within cropping window 500, base image 502 is presented. Base image 502 corresponds to the image viewed by the user in image area 302 and depicts the maximum image content available to the user. Also displayed to the user in cropping window 500 is cropping indicator 504, also referred to herein as a crop box, which shows the user the portion of image 502 that is currently being displayed in image area 302. The ratio of the height and width of crop box 504 is controlled to be the same as the ratio of the height and width of the selected image area, in this case image area 302.

Crop box 504 can be repositioned within image 502 by the user using conventional click-and-drag techniques with the user's mouse. When the user releases crop box 504 after moving it to another location, design tool 106 updates the image contents of image area 302 to reflect the portion of image 502 now indicated by the current position of the cropping indicator. As discussed below, cropping indicator 504 can also be resized by the user using corner handles 506, 508, 510 and 512.

Figure 6:
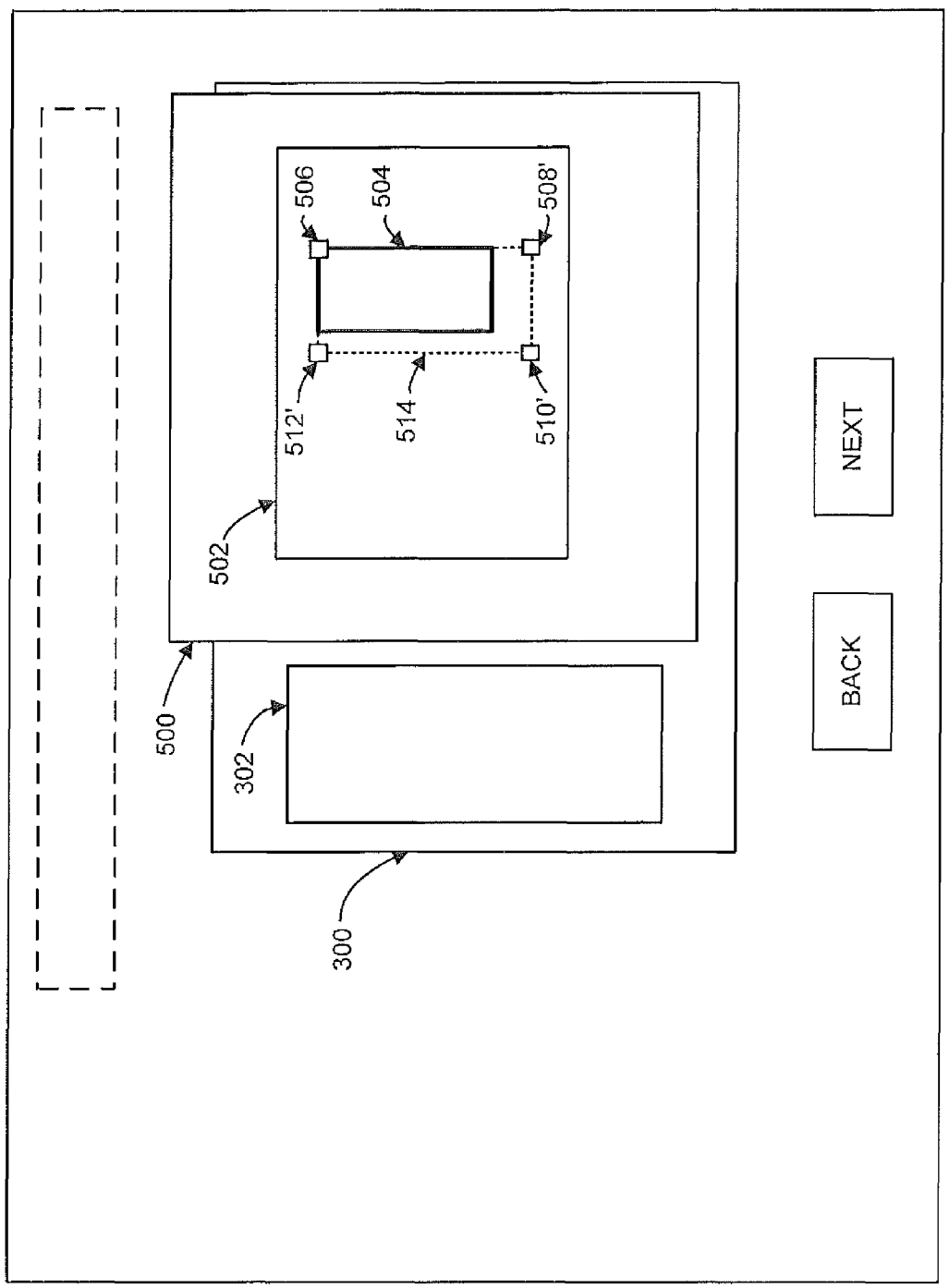

In the situation depicted in FIG. 6, the user has dragged window 500 slightly to the right, to enable the user to have a better view of image area 302, and has dragged corner 510 of crop box 504 to a new position indicated as 510', creating resized crop box 514. While a corner of the cropping indicator is being moved, the position of the opposite corner of the will remain fixed. The crop box can be made larger or smaller, but the ratio of height to width is constrained to remain constant to ensure that the cropped image properly fits the available image area in the product design. The other two corners of the cropping indicator move as necessary to ensure that the crop box retains the appropriate ratio of height to width.

The user resizes the crop box by clicking and dragging one of the corner handles until the crop box has been reduced or enlarged to the degree desired by the user. As with the repositioning operation, when the user releases the mouse button, the contents of image area 302 are updated to display the portion of image 502 indicated by the resized crop box. The user may continue to repetitively resize and/or reposition the crop box and review the resulting effect on template 300 until the user is satisfied with the portion of image 502 displayed in image area 302.

Figure 7:
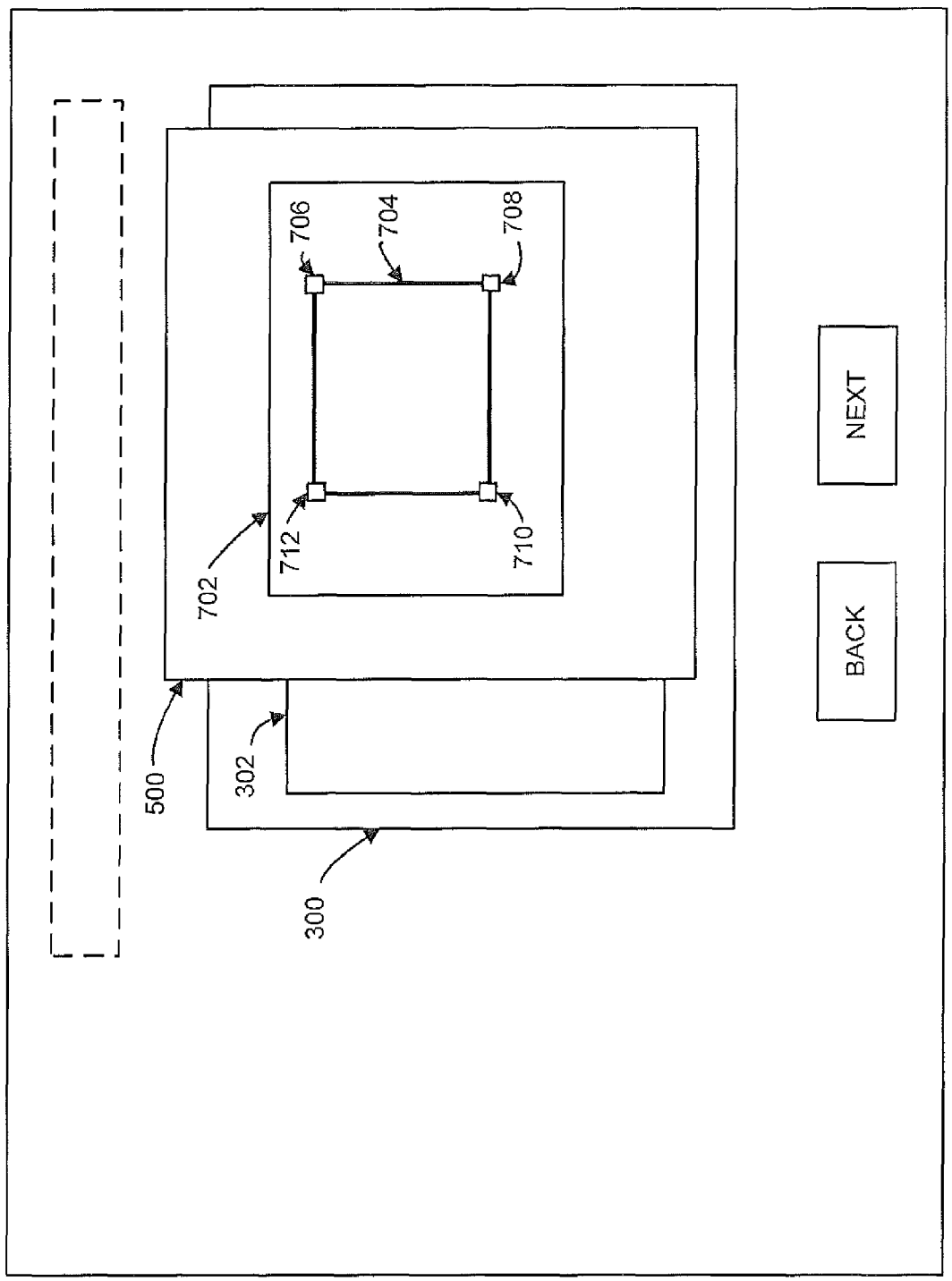

Referring to FIG. 7, an alternate example will be discussed. Instead of double clicking on image area 302, the user has double clicked on background image area 304. In this case, cropping window 500 presents the base image 702 associated with the image of image area 304. Base image 702 is the total available image content from which the user can select a new cropped area. Cropping indicator 704 indicates the portion of image 702 currently being displayed in image area 304. In this example, because image area 304 covers the entire side of the product, cropping indicator 704 has the same height to width ratio as the postcard product being designed. The user can reposition the crop box or can resize it using handles 706, 708, 710 and 712 in the same manner as discussed above in connection with FIG. 6.

FIGS. 5-7 and the corresponding discussions relate to a user's desire to re-crop the current images 302 or 304. As indicated in FIG. 4, the user is also offered to option of replacing one or both of the current images with different images. The different images could be another image from a gallery of images provided by the service provider or an image uploaded by the user, such as a logo or photograph, for incorporation into the product being designed.

Figure 8:
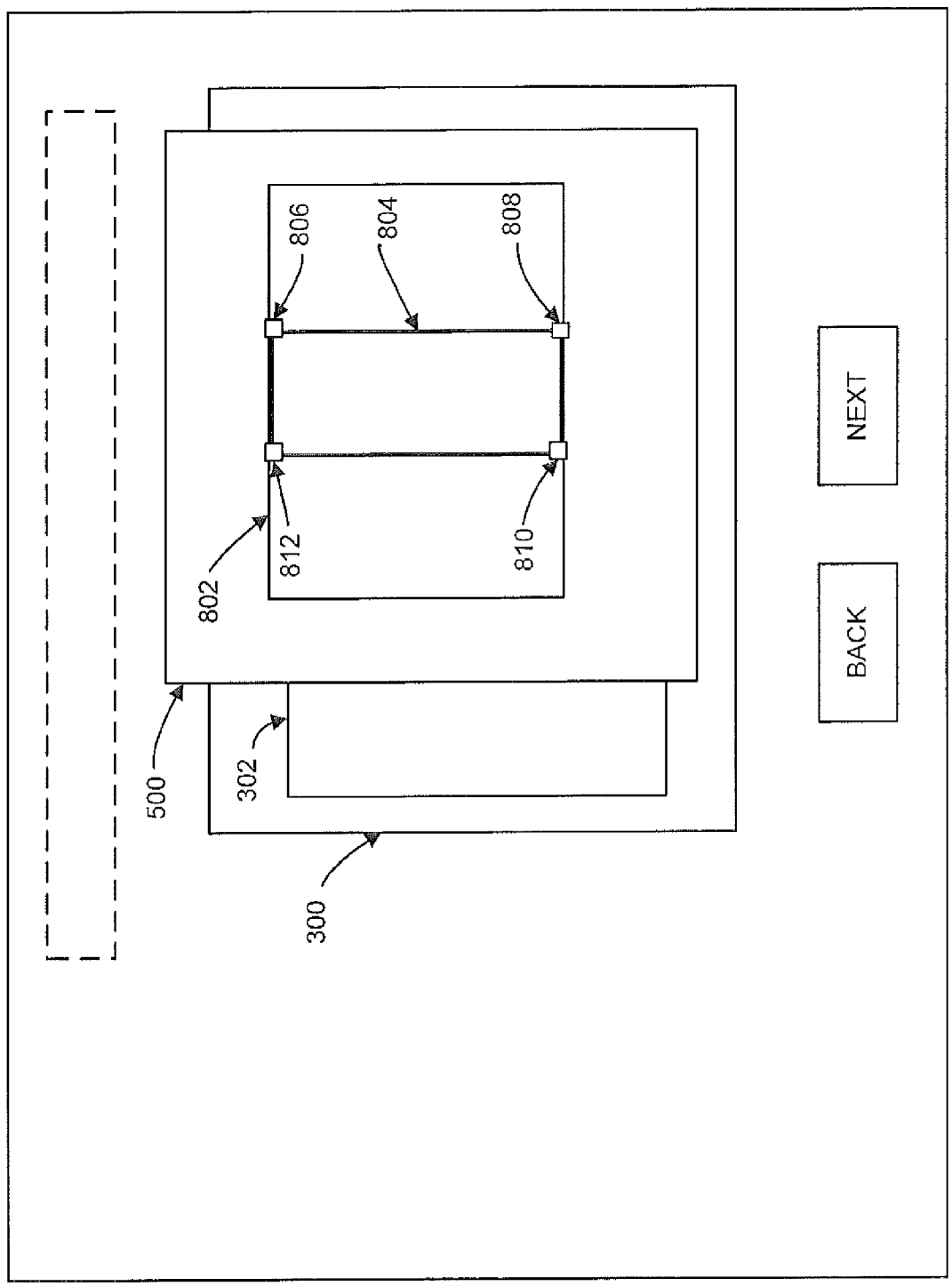

Referring again to FIG. 4, if the user selects button 404, the user will be presented with one or more additional screens (not shown) allowing the user to review one or more available alternate base images from which the user can select a new image to use as new image content for the selected image area of the product. Referring to FIG. 8, after a user has selected button 404 and then selected a new image, the new base image 802 is displayed in cropping window 500. In this situation, because no part of the newly selected image was previously being displayed in image area 302, cropping indicator 804 will be placed at a default location. As discussed above, to ensure compatibility with the image area in the design, crop box 804 will have the same height to width ratio as the selected image area. By default, cropping indicator 804 is sized to fit one dimension of image, which could be either the vertical or horizontal dimension, depending on the height to width ratio of base image 802 and the height to width ratio of the selected image area in the product. Cropping indicator 802 is centered within the other dimension. The user, as described above, can resize and/or reposition the crop box. The content of the selected product image area will be updated to display the portion of image 802 that corresponds to the current cropping indicator location.

As mentioned, to ensure that all cropping performed by the user will properly fit the associated layout image container, the ratio of height to width of the cropping indicator is maintained constant. Of course, the user is in control of the user's mouse cursor position and, once the user has grabbed one of the crop box handles, the user is free to move the mouse in any direction. To ensure that the cropping indicator height to width ratio remains constant, the system must translate the user's mouse movements into allowable cropping indicator modifications that maintain the appropriate height to width ratio.

Figure 9:
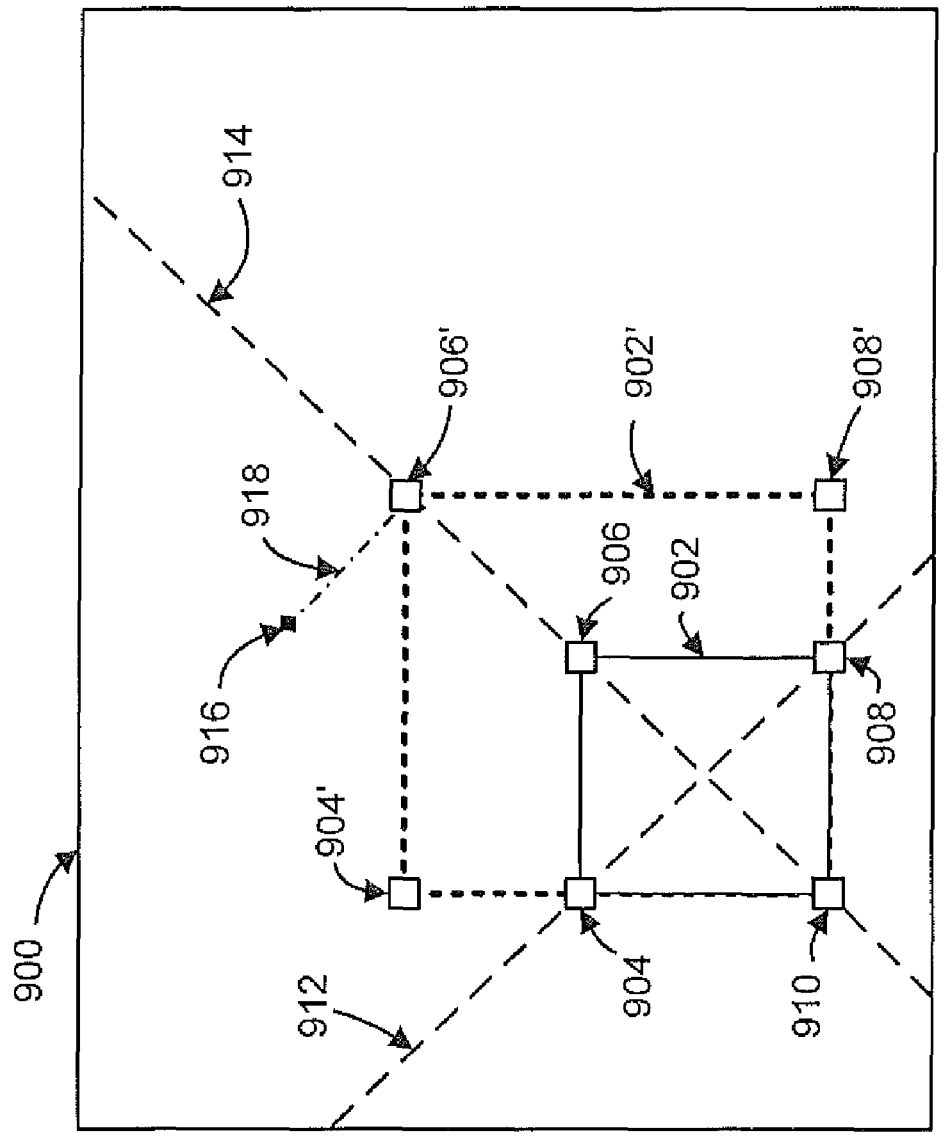
FIG. 9 is a representation of the positioning and control of the cropping indicator.

Referring to FIG. 9, a technique for resizing control of the cropping indicator will be discussed. As mentioned above, when a user is engaged in re-cropping an image, the user is presented with a cropping window containing a base image and a cropping indicator that has the same ratio of height to width as the selected image area in the electronic product and is positioned to indicate the position of the current portion of the base image being displayed in the selected image area. In the general case example of FIG. 9, the user is presented with a representative base image 900 and a representative crop box 902, having corners 904, 906, 908, and 910. Design tool 106, using the current horizontal and vertical positions of the four corners of crop box 902, can calculate the slope of the line running through corners 904 and 908, indicated by dashed line 912, and the slope of the line running through corners 906 and 910, indicated by dashed line 914. To maintain the proper height to width ratio of the cropping indicator, when a corner of the indicator is moved by the user, the corner can only be allowed to move along that corner's corresponding slope line.

In most cases, the user's actual mouse movements with not follow the conceptual slope line. Compensating for erratic user mouse movements is accomplished by calculating the position of the corner along the slope line that approximates the user's mouse position. In the example of FIG. 9, the user positioned his mouse cursor over corner 906 and proceeded to move the mouse cursor to the position indicated as 916. To maintain the required height to width ratio, the corner being moved cannot be allowed to deviate from slope line 914. Therefore, while the user is engaged in the resizing process, design tool 106 repetitively takes the current mouse position, calculates the location of the intersection on slope 914 of a line drawn perpendicular to slope line 914 from the current mouse position, and positions the corner being moved at that point of intersection, represented by corner 906'. The corresponding positions of the two remaining corners 904' and 908' of resized cropping indicator 902' can be readily determined from the height to width ratio of the cropping indicator, the position of corner 906', and the position of corner 910, which remains fixed while corner 906 is being moved.

It is possible that a user could reduce the size of the crop box to a point where there is insufficient image information available to yield a suitable image when the selected portion of the base image is placed in the selected image area. In a preferred embodiment, design tool 106 will also repetitively monitor the size of the cropping indicator during the user's resizing process for unacceptably low image resolution. If the size of the cropping indicator will result in a portion of the base image that does not contain enough information to yield a good quality image, a warning message is generated to alert the user to the likelihood that the current crop box size will result in poor image quality.

While an illustrative embodiment has been discussed, alternate embodiments could also be employed. For example, while the invention has been described in a Web-based environment, it is not so limited. Therefore, the described embodiments are to be considered as illustrative rather than restrictive and the scope of the invention is as indicated in the following claims and all equivalent methods and systems.

What is claimed is:

1. A computer-implemented method for facilitating user customization of the image content of an image container in an electronic product design, the method comprising
    displaying by one or more processors an electronic product design on an electronic display, the design containing at least one or more user-customizable image containers, each image container characterized by an associated height-to-width ratio and each image container having associated therewith a base image and cropping information identifying at least a portion of the base image as content of the image container;
    allowing, by one or more processors, selection by a user of an image container in the electronic product design for customization of the content of the image container, and
    in response to a user request to perform custom cropping for the selected image container, displaying on the electronic display by one or more processors the associated base image and a cropping indicator having a height-to-width ratio which matches the height-to-width ratio of the selected image container and positioned over the base image to indicate to the user the portion of the base image that is the current content of the image container.

2. The method of claim 1 further comprising allowing the user to modify the size of the cropping indicator relative to the base image while maintaining the height-to-width ratio of the selected image container, and in response to user modification of the size of the cropping indicator, updating by one or more processors the cropping information identifying the portion of the base image indicated by the modified cropping indicator.

3. The method of claim 2 wherein the cropping indicator is characterized by a box shape having four corners, wherein
    in response to user modification of the size of the cropping indicator, each corner of the cropping indicator is only allowed by one or more processors to move along a slope line defined by the original position of the corner and the original position of its opposite corner.

4. The method of claim 2 wherein, upon completion of a cropping indicator size modification, the selected image container is updated by one or more processors to incorporate the portion of the base image indicated by the modified cropping indicator.

5. The method of claim 3 wherein, upon completion of a cropping indicator size modification, the selected image container is updated by one or more processors to incorporate the portion of the base image indicated by the modified cropping indicator.

6. The method of claim 1 further comprising allowing the user to reposition the cropping indicator relative to the base image, and in response to user repositioning of the cropping indicator, updating by one or more processors the cropping information identifying the portion of the base image indicated by the repositioned cropping indicator.

7. The method of claim 6 wherein, upon completion of a cropping indicator repositioning, the selected image container is updated by one or more processors to incorporate the portion of the base image indicated by the repositioned cropping indicator.

8. The method of claim 2, further comprising
    detecting by one or more processors selection of a corner of the image container by a mouse,
    calculating by one or more processors the slope of the line between the selected corner and its opposite corner of the cropping indicator, and
    repetitively monitoring by one or more processors a current position of the mouse on the display, calculating a point of intersection on the slope of the line between the slope line and a perpendicular line between the current mouse position and the slope line, positioning the selected corner at the calculated point of intersection, calculating the positions of the corners of the cropping indicator that are adjacent to the selected corner so as to maintain the height-to-width ratio of the cropping indicator to match the height-to-width ratio of the selected image container, and updating the display of the cropping indicator over the base image with the modified positions of the corners of the cropping indicator.

9. The method of claim 3, further comprising
detecting by one or more processors selection of a corner of the image container by a mouse,
calculating by one or more processors the slope of the line between the selected corner and its opposite corner of the cropping indicator, and
repetitively monitoring by one or more processors a current position of the mouse on the display, calculating a point of intersection on the slope of the line between the slope line and a perpendicular line between the current mouse position and the slope line, positioning the selected corner at the calculated point of intersection, calculating the positions of the corners of the cropping indicator that are adjacent to the selected corner so as to maintain the height-to-width ratio of the cropping indicator to match the height-to-width ratio of the selected image container, and updating the display of the cropping indicator over the base image with the modified positions of the corners of the cropping indicator.

10. The method of claim 1 further including allowing by one or more processors the user to select a different base image to be associated with the selected image container.

11. The method of claim 4 further comprising forwarding by one or more processors the electronic product design to a printer for printing.

12. The method of claim 5 further comprising forwarding by one or more processors the electronic product design to a printer for printing.

13. The method of claim 7 further comprising forwarding by one or more processors the electronic product design to a printer for printing.

14. A Non-transitory computer readable storage memory tangibly embodying program instructions which, when executed by one or more processors, implements a method for facilitating user customization of the image content of an image container in an electronic product design, the method comprising
displaying an electronic product design to a user, the design containing at least one or more user-customizable image containers, each image container characterized by an associated height-to-width ratio and each image container having associated therewith a base image and cropping information identifying at least a portion of the base image as content of the image container;
allowing the user to select an image container in the electronic product design for customization of the content of the image container, wherein
in response to a user request to perform custom cropping for the selected image container, the associated base image and a cropping indicator having a height-to-width ratio which matches the height-to-width ratio of the selected image container and positioned over the base image to indicate to the user the portion of the base image that is the current content of the image container is displayed to the user.

15. The memory of claim 14, the method further comprising allowing the user to modify the size of the cropping indicator relative to the base image while maintaining the height-to-width ratio of the selected image container, and in response to user modification of the size of the cropping indicator, updating the cropping information identifying the portion of the base image indicated by the modified cropping indicator.

16. The memory of claim 15 wherein the cropping indicator is characterized by a box shape having four corners, wherein
in response to user modification of the size of the cropping indicator, each corner of the cropping indicator is only allowed to move along a slope line defined by the original position of the corner and the original position of its opposite corner.

17. The memory of claim 15 wherein, upon completion of a cropping indicator size modification, the selected image container is updated to incorporate the portion of the base image indicated by the modified cropping indicator.

18. The memory of claim 16 wherein, upon completion of a cropping indicator size modification, the selected image container is updated to incorporate the portion of the base image indicated by the modified cropping indicator.

19. The memory of claim 14, the method further comprising allowing the user to reposition the cropping indicator relative to the base image, and in response to user repositioning of the cropping indicator, updating the cropping information identifying the portion of the base image indicated by the repositioned cropping indicator.

20. The memory of claim 19 wherein, upon completion of a cropping indicator repositioning, the selected image container is updated to incorporate the portion of the base image indicated by the repositioned cropping indicator.

21. The memory of claim 15, the method further comprising
detecting selection of a corner of the image container by a mouse,
calculating the slope of the line between the selected corner and its opposite corner of the cropping indicator, and
repetitively monitoring a current position of the mouse on the display, calculating a point of intersection on the slope of the line between the slope line and a perpendicular line between the current mouse position and the slope line, positioning the selected corner at the calculated point of intersection, calculating the positions of the corners of the cropping indicator that are adjacent to the selected corner so as to maintain the height-to-width ratio of the cropping indicator to match the height-to-width ratio of the selected image container, and updating the display of the cropping indicator over the base image with the modified positions of the corners of the cropping indicator.

22. The memory of claim 16, the method further comprising
detecting selection of a corner of the image container by a mouse,
calculating the slope of the line between the selected corner and its opposite corner of the cropping indicator, and
repetitively monitoring a current position of the mouse on the display, calculating a point of intersection on the slope of the line between the slope line and a perpendicular line between the current mouse position and the slope line, positioning the selected corner at the calculated point of intersection, calculating the positions of the corners of the cropping indicator that are adjacent to the selected corner so as to maintain the height-to-width ratio of the cropping indicator to match the height-to-width ratio of the selected image container, and updating the display of the cropping indicator over the base image with the modified positions of the corners of the cropping indicator.

23. The memory of claim 14, the method further comprising allowing the user to select a different base image to be associated with the selected image container.

24. The memory of claim 17, the method further comprising forwarding the electronic product design to a printer for printing.

25. The memory of claim 18, the method further comprising forwarding the electronic product design to a printer for printing.

26. The memory of claim 20, the method further comprising forwarding the electronic product design to a printer for printing.

27. A system for facilitating user customization of image content of an image container in an electronic product design, the system comprising:
    one or more processors configured to
    display an electronic product design to a user, the design containing at least one or more user-customizable image containers, each image container characterized by an associated height-to-width ratio and each image container having associated therewith a base image and cropping information identifying at least a portion of the base image as content of the image container, and
    in response to user selection of an image container in the electronic product design for customization of the content of the image container and a user request to perform custom cropping for the selected image container are provided, to display to the user the associated base image and a cropping indicator having a height-to-width ratio which matches the height-to-width ratio of the selected image container and positioned over the base image to indicate to the user the portion of the base image that is the current content of the selected image container.

28. The system of claim 27, the one or more processors further configured to allow the user to modify the size of the cropping indicator relative to the base image while maintaining the height-to-width ratio of the selected image container, and in response to user modification of the size of the cropping indicator, to update the cropping information identifying the portion of the base image indicated by the modified cropping indicator.

29. The system of claim 28 wherein the cropping indicator is characterized by a box shape having four corners, and wherein to allow the user to modify the size of the cropping indicator relative to the base image while maintaining the height-to-width ratio of the selected image container, the one or more processors are configured to allow movement of each corner of the cropping indicator only along a slope line defined by the original position of the respective corner and the original position of the corner opposite the respective corner.

30. The system of claim 28, the one or more processors further configured to update the selected image container upon completion of a cropping indicator size modification to incorporate the portion of the base image indicated by the modified cropping indicator.

31. The system of claim 29, the one or more processors further configured to update the selected image container upon completion of a cropping indicator size modification to incorporate the portion of the base image indicated by the modified cropping indicator.

32. The system of claim 27, the one or more processors further configured to allow the user to reposition the cropping indicator relative to the base image, and responsive to user repositioning of the cropping indicator by updating the cropping information identifying the portion of the base image indicated by the repositioned cropping indicator.

33. The system of claim 32, the one or more processors further configured to update the selected image container upon completion of a cropping indicator repositioning to incorporate the portion of the base image indicated by the modified cropping indicator.

34. The system of claim 28, wherein the cropping indicator is characterized by a box shape having four corners, and wherein to allow the user to modify the size of the cropping indicator relative to the base image while maintaining the height-to-width ratio of the selected image container, the one or more processors are configured to
    detect selection of a corner of the image container by a mouse,
    calculate the slope of the line between the selected corner and its opposite corner of the cropping indicator, and
    repetitively monitor a current position of the mouse on the display, calculate a point of intersection on the slope of the line between the slope line and a perpendicular line between the current mouse position and the slope line, position the selected corner at the calculated point of intersection, calculate the positions of the corners of the cropping indicator that are adjacent to the selected corner so as to maintain the height-to-width ratio of the cropping indicator to match the height-to-width ratio of the selected image container, and update the display of the cropping indicator over the base image with the modified positions of the corners of the cropping indicator.

35. The system of claim 29, wherein the cropping indicator is characterized by a box shape having four corners, and wherein to allow the user to modify the size of the cropping indicator relative to the base image while maintaining the height-to-width ratio of the selected image container, the one or more processors are configured to
    detect selection of a corner of the image container by a mouse,
    calculate the slope of the line between the selected corner and its opposite corner of the cropping indicator, and
    repetitively monitor a current position of the mouse on the display, calculate a point of intersection on the slope of the line between the slope line and a perpendicular line between the current mouse position and the slope line, position the selected corner at the calculated point of intersection, calculate the positions of the corners of the cropping indicator that are adjacent to the selected corner so as to maintain the height-to-width ratio of the cropping indicator to match the height-to-width ratio of the selected image container, and update the display of the cropping indicator over the base image with the modified positions of the corners of the cropping indicator.

* * * * *